(12) United States Patent
Suenaga et al.

(10) Patent No.: US 10,822,507 B2
(45) Date of Patent: Nov. 3, 2020

(54) CURABLE COMPOSITION, CURABLE INK, COMPOSITION STORED CONTAINER, IMAGE FORMING APPARATUS, IMAGE FORMING METHOD, CURED PRODUCT, AND DECORATED BODY

(71) Applicants: Takenori Suenaga, Kanagawa (JP); Masahide Kobayashi, Kanagawa (JP); Mitsunobu Morita, Shizuoka (JP); Soh Noguchi, Kanagawa (JP); Takashi Okada, Kanagawa (JP)

(72) Inventors: Takenori Suenaga, Kanagawa (JP); Masahide Kobayashi, Kanagawa (JP); Mitsunobu Morita, Shizuoka (JP); Soh Noguchi, Kanagawa (JP); Takashi Okada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/292,421

(22) Filed: Mar. 5, 2019

(65) Prior Publication Data

US 2019/0284408 A1    Sep. 19, 2019

(30) Foreign Application Priority Data

Mar. 13, 2018 (JP) .................. 2018-045453
Nov. 26, 2018 (JP) .................. 2018-219932

(51) Int. Cl.
*C09D 11/30* (2014.01)
*C09D 11/101* (2014.01)
(Continued)

(52) U.S. Cl.
CPC ............ *C09D 11/30* (2013.01); *B29C 64/129* (2017.08); *B29C 64/255* (2017.08);
(Continued)

(58) Field of Classification Search
CPC ....................... B41M 5/50; Y10T 428/24802
(Continued)

(56) References Cited

U.S. PATENT DOCUMENTS

2014/0363634 A1   12/2014   Morita et al.
2017/0183519 A1   6/2017   Morita et al.
(Continued)

FOREIGN PATENT DOCUMENTS

EP   0020000 B1 *   6/1983   .............. C08F 20/10
EP   0275470 B1 *   3/1991   ............ C07C 233/49
(Continued)

*Primary Examiner* — Betelhem Shewareged
(74) *Attorney, Agent, or Firm* — Oblon, McClelland, Maier & Neustadt, L.L.P.

(57) ABSTRACT

A curable composition is provided comprising an acrylamide compound represented by the following general formula (1):

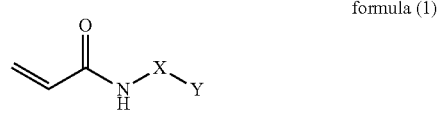

formula (1)

wherein, X represents a branched alkylene group having 2 to 5 carbon atoms, and Y represents the following general formula (2):

formula (2)

(Continued)

wherein, R represents an alkyl group having 1 to 4 carbon atoms, and * represents a binding site with X.

10 Claims, 2 Drawing Sheets

(51) Int. Cl.
- C09D 11/107 (2014.01)
- B41M 5/00 (2006.01)
- B29C 64/264 (2017.01)
- B33Y 30/00 (2015.01)
- B33Y 70/00 (2020.01)
- B29C 64/129 (2017.01)
- B29C 64/255 (2017.01)
- B33Y 10/00 (2015.01)
- B41M 5/50 (2006.01)

(52) U.S. Cl.
CPC ............ *B29C 64/264* (2017.08); *B33Y 10/00* (2014.12); *B33Y 30/00* (2014.12); *B33Y 70/00* (2014.12); *B41M 5/0023* (2013.01); *B41M 5/50* (2013.01); *C09D 11/101* (2013.01); *C09D 11/107* (2013.01); *Y10T 428/24802* (2015.01)

(58) Field of Classification Search
USPC ...................................................... 428/195.1
See application file for complete search history.

(56) References Cited

U.S. PATENT DOCUMENTS

2018/0127607 A1　5/2018　Morita et al.
2019/0284408 A1*　9/2019　Suenaga .............. C09D 11/322

FOREIGN PATENT DOCUMENTS

| JP | 2009-215179 | 9/2009 |
| JP | 2015-013980 | 1/2015 |
| JP | 2016-113518 | 6/2016 |
| JP | 2018-080321 | 5/2018 |

* cited by examiner

CURABLE COMPOSITION, CURABLE INK, COMPOSITION STORED CONTAINER, IMAGE FORMING APPARATUS, IMAGE FORMING METHOD, CURED PRODUCT, AND DECORATED BODY

CROSS-REFERENCE TO RELATED APPLICATIONS

This patent application is based on and claims priority pursuant to 35 U.S.C. § 119(a) to Japanese Patent Application Nos. 2018-045453 and 2018-219932, filed on Mar. 13, 2018 and Nov. 26, 2018, respectively, in the Japan Patent Office, the entire disclosure of each of which is hereby incorporated by reference herein.

BACKGROUND

Technical Field

The present invention relates to a curable composition, a curable ink, a composition stored container, an image forming apparatus, an image forming method, a cured product, and a decorated body.

Description of the Related Art

As a method of forming an image on a recording medium such as paper, an inkjet recording method is known. This recording method is high in ink consumption efficiency and excellent in resource-saving property, and makes it possible to reduce an ink cost per a recording unit.

In recent years, ink jet recording methods using active-energy-ray-curable inks have attracted attention. For example, an active-energy-ray-curable resin composition containing an urethane oligomer having a (meth)acrylamide group at a terminal or a side chain, an N-substituted (meth)acrylamide, and a nonreactive diluent is proposed.

Also, a compound which includes an organic group having 1 to 10 carbon atoms (including an aromatic ring) as a core and includes a (meth)acrylate group and a vinyl group in one molecule, and a composition for optical nanoimprint including the compound are proposed.

SUMMARY

An embodiment of the present invention provides a curable composition containing an acrylamide compound represented by the following general formula (1).

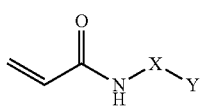

formula (1)

In general formula (1), X represents a branched alkylene group having 2 to 5 carbon atoms, and Y represents the following general formula (2).

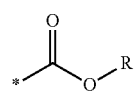

formula (2)

In general formula (2), R represents an alkyl group having 1 to 4 carbon atoms, and * represents a binding site with X.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

Figure 1:
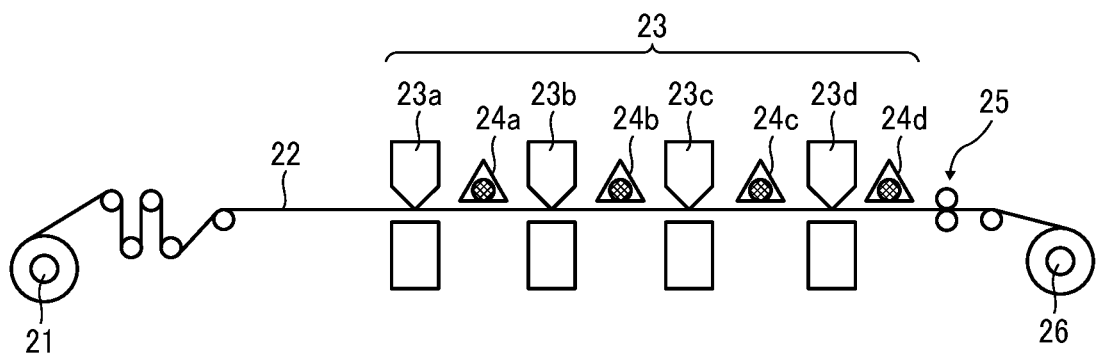
FIG. 1 is a schematic view illustrating an image forming apparatus according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

According to an embodiment of the present invention, a curable composition that has excellent photopolymerization reactivity and becomes a cured film having excellent hardness is provided.

Hereinafter, embodiments of the present invention will be described in more detail.

(Curable Composition)

The curable composition of the present disclosure contains an acrylamide compound represented by the following general formula (1), and may optionally contain another curable compound, a polymerization initiator, an organic solvent, a colorant, and other components.

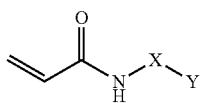

formula (1)

In general formula (1), X represents a branched alkylene group having 2 to 5 carbon atoms, and Y represents the following general formula (2).

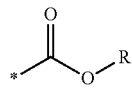

formula (2)

In general formula (2), R represents an alkyl group having 1 to 4 carbon atoms, and * represents a binding site with X.

X is preferably a branched alkylene group having 4 to 5 carbon atoms.

<Acrylamide Compound Represented by General Formula (I)>

The compound represented by the general formula (1) contained in the curable composition and ink of the present disclosure characteristically includes a secondary acrylamide and an ester on the core structure of the alkylene group containing a tertiary carbon, A compound having a high intermolecular interaction due to the presence of a polar functional group is crystallized in some cases. Such a compound has a drawback of having a large restriction on use for curable compositions, particularly, for inkjet inks. In addition, there is another problem that the strength of the cured product is decreased as the steric hindrance is increased due to the presence of an alkyl chain.

The compound represented by the general formula (1) has an appropriate polarity attributed to the secondary acrylamide and the ester, and an appropriate degree of the steric hindrance attributed to the alkylene group containing the tertiary carbon, and thus provides a cured product having a high hardness and excellent photopolymerization reactivity. As a result, the acrylamide compound represented by the above general formula (1) can be suitably used as a curable composition, particularly as an inkjet ink.

The acrylamide compound represented by the general formula (1) is preferably a compound represented by the following general formula (3) because the compound has an appropriate polarity and an appropriate degree of the steric hindrance.

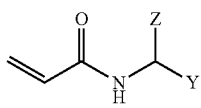

formula (3)

In general formula (3), Z represents an alkyl group having 1 to 4 carbon atoms, and Y represents the following general formula (2).

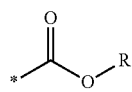

formula (2)

In general formula (2), R represents an alkyl group having 1 to 4 carbon atoms, and * represents a binding site with a tertiary carbon atom in the general formula (3).

When Z has 3 to 4 carbon atoms, Z may be a branched alkyl group.

Hereinafter, specific examples of the acrylamide compounds represented by the general formula (1) will be described, but are not limited to these compounds.

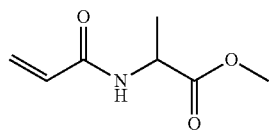

a-1

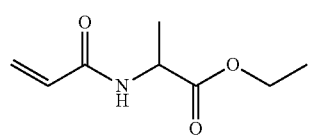

a-2

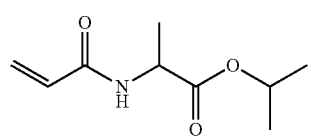

a-3

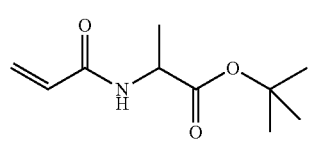

a-4

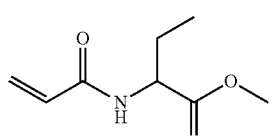

b-1

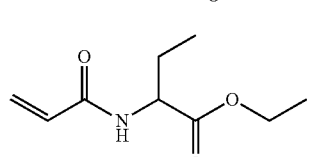

b-2

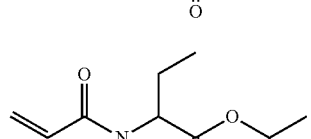

b-3

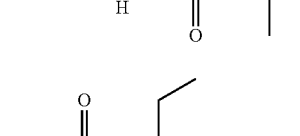

b-4

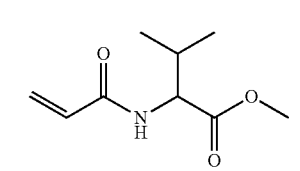

c-1

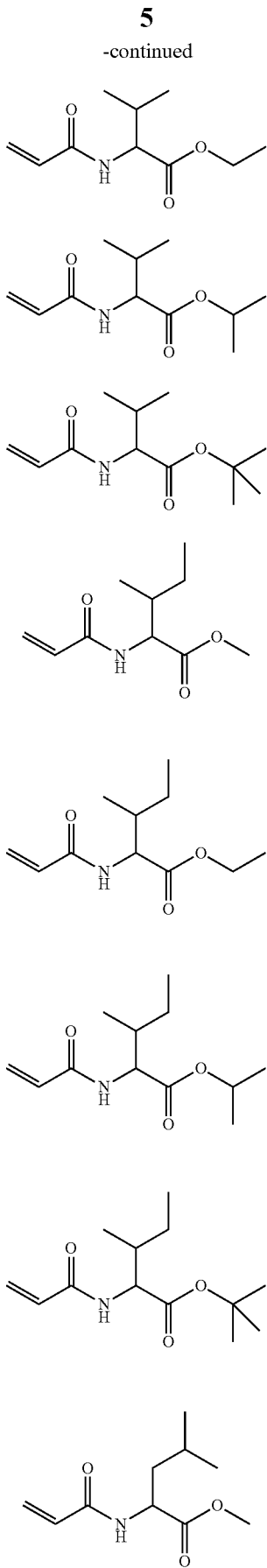

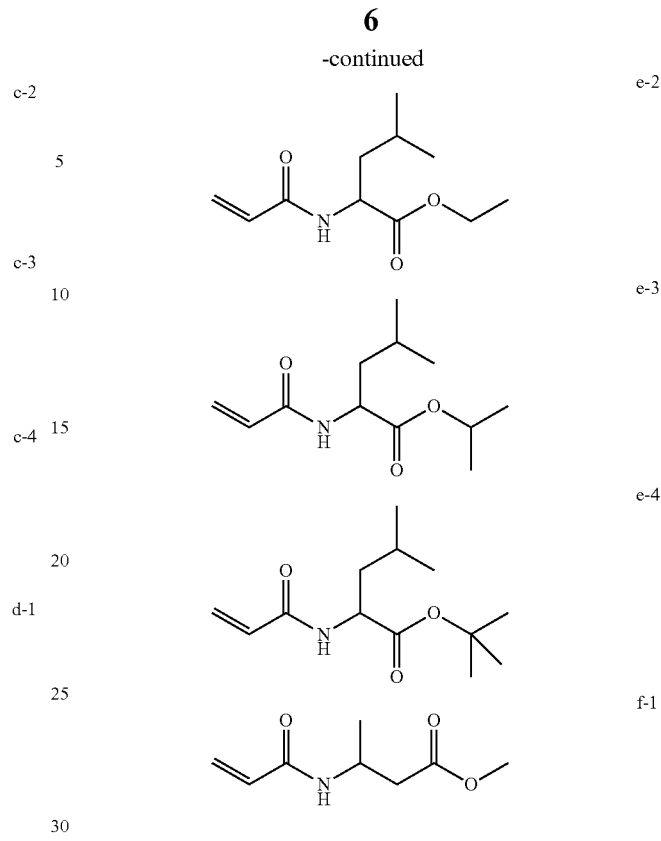

The acrylamide compound represented by the general formula (1) can be a mixture of two or more different compounds. In this case, the different compounds include structural isomers. The mixing ratio is not particularly limited.

A content of the acrylamide compound in the curable composition or the curable ink is normally 20% to 98% by mass, and preferably 30% to 90% by mass.

<Another Photopolymerizable Compound>

The curable composition may include another photopolymerizable compounds other than the acrylamide compound represented by the general formula (1). A mass ratio of the other photopolymerizable compound to the acrylamide compound represented by the general formula (1) is normally 0.01 to 100, preferably 0.1 to 50 when the mass of the acrylamide compound is defined as 1.

The other photopolymerizable compound is not particularly limited. Examples of the other photopolymerizable compound include a photoradically polymerizable compound, a photocationically polymerizable compound, a photoanionically polymerizable compound, and combinations thereof.

The photoradically polymerizable compound is not particularly limited as long as the compound has one or more photoradically-polymerizable ethylenically unsaturated groups. The compound may be either a monomer, an oligomer, or a polymer. Examples of the photoradically polymerizable compound include, but are not limited to, unsaturated carboxylic acids such as acrylic acid, methacrylic acid, itaconic acid, crotonic acid, isocrotonic acid, and maleic acid, and salts thereof, and compounds derived therefrom, as well as ethylenically-unsaturated-group-containing anhydride, acrylonitrile, styrene, unsaturated polyester, unsaturated polyether, unsaturated polyamide, and unsaturated urethane.

Specific examples of the photoradically polymerizable compound include, but are not limited to, an acrylic acid derivative such as 2-hydroxyethyl acrylate, butoxyethyl acrylate, carbitol acrylate, cyclohexyl acrylate, tetrahydrofurfuryl acrylate, benzyl acrylate, bis(4-acryloxypolyethoxyphenyl) propane, neopentyl glycol diacrylate, ethoxylated neopentyl glycol diacrylate, propoxylated neopentyl glycol diacrylate, 1,6-hexanediol diacrylate, ethylene glycol diacrylate, diethylene glycol diacrylate, triethylene glycol diacrylate, tetraethylene glycol diacrylate, polyethylene glycol diacrylate, propylene glycol diacrylate, dipropylene glycol diacrylate, tripropylene glycol diacrylate, tetrapropylene glycol diacrylate, polypropylene glycol diacrylate, pentaerythritol triacrylate, pentaerythritol tetraacrylate, dipentaerythritol tetraacrylate, trimethylolpropane triacrylate, tetramethylolmethane tetraacrylate, oligoester acrylate, and epoxy acrylate; an methacrylic acid derivative such as methyl methacrylate, n-butyl methacrylate, allyl methacrylate, glycidyl methacrylate, benzyl methacrylate, dimethylaminomethyl methacrylate, 1,6-hexanediol dimethacrylate, ethylene glycol dimethacrylate, triethylene glycol dimethacrylate, polyethylene glycol dimethacrylate, polypropylene glycol dimethacrylate, trimethylolethane trimethacrylate, trimethylolpropane trimethacrylate, and 2,2-bis(4-methacryloxypolyethoxyphenyl) propane; an acrylamide derivative such as N-methylolacrylamide, diacetone acrylamide, 2-hydroxyethylacrylamide, and acryloyl morpholine; an allyl compound derivative such as allyl glycidyl ether, diallyl phthalate, and triallyl trimellitate; a di- or tri-vinyl ether compound such as ethylene glycol divinyl ether, ethylene glycol monovinyl ether, diethylene glycol divinyl ether, triethylene glycol monovinyl ether, triethylene glycol divinyl ether, propylene glycol divinyl ether, dipropylene glycol divinyl ether, butanediol divinyl ether, hexanediol divinyl ether, cyclohexanedimethanol divinyl ether, hydroxyethyl monovinyl ether, hydroxynonyl monovinyl ether, and trimethylolpropane trivinyl ether; a monovinyl ether compound such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-o-propylene carbonate, dodecyl vinyl ether, diethylene glycol monovinyl ether, and octadecyl vinyl ether; as well as 2-ethylhexyl diglycol acrylate, 2-hydroxy-3-phenoxypropyl acrylate, 2-hydroxybutyl acrylate, hydroxy pivalic acid neopentyl glycol diacrylate, 2-acryloyloxyethyl phthalic acid, methoxy polyethylene glycol acrylate, tetramethylolmethane triacrylate, 2-acryloyloxyethyl-2-hydroxyethyl phthalic acid, dimethylol tricyclodecane diacrylate, ethoxylated phenyl acrylate, 2-acryloyloxyethyl succinic acid, acrylate of nonylphenol ethylene oxide adduct, modified glycerin triacrylate, acrylic acid-added bisphenol A diglycidyl ether, modified bisphenol A diacrylate, phenoxy polyethylene glycol acrylate, 2-acryloyloxyethyl hexahydrophthalic acid, diacrylate of propylene oxide adduct of bisphenol A, diacrylate of ethylene oxide adduct of bisphenol A, dipentaerythritol hexaacrylate, pentaerythritol triacrylate, tolylene diisocyanate urethane prepolymer, lactone-modified flexible acrylate, butoxyethyl acrylate, acrylic acid-added propylene glycol diglycidyl ether, pentaerythritol triacrylate, hexamethylene diisocyanate urethane prepolymer, 2-hydroxyethyl acrylate, methoxy dipropylene glycol acrylate, ditrimethylolpropane tetraacrylate, pentaerythritol triacrylate, hexamethylene diisocyanate urethane prepolymer, stearyl acrylate, isoamyl acrylate, isomyristyl acrylate, isostearyl acrylate, and lactone-modified acrylate.

Examples of the photocationically polymerizable compound include, but are not limited to, an epoxy compound, a vinyl ether compound, and an oxetane compound.

Examples of the photoanionically polymerizable compound include, but are not limited to, an epoxy compound, a lactone compound, an acrylic compound, and a methacrylic compound. Above all, the acrylic compounds and the methacrylic compounds exemplified as the photoradically polymerizable compound are preferable.

<Polymerization Initiator>

The curable composition of the present disclosure optionally contains a polymerization initiator. The polymerization initiator produces active species such as a radical or a cation upon application of energy of an active energy ray and initiates polymerization of a polymerizable compound (monomer or oligomer). As the polymerization initiator, it is suitable to use a known radical polymerization initiator, cation polymerization initiator, base producing agent, or a combination thereof. Of these, a radical polymerization initiator is preferable. Moreover, the polymerization initiator preferably accounts for 5% to 20% by mass of the total mass of the composition (100% by mass) to obtain sufficient curing speed.

Specific examples of the radical polymerization initiators include, but are not limited to, aromatic ketones, acylphosphine oxide compounds, aromatic onium salt compounds, organic peroxides, thio compounds (thioxanthone compounds, thiophenyl-group-containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds. The radical polymerization initiator is preferably an aromatic ketone, such as IRGACURE 907.

In addition, a polymerization accelerator (sensitizer) is optionally used together with the polymerization initiator. The polymerization accelerator is not particularly limited. Preferred examples thereof include, but are not limited to, amines such as trimethylamine, methyl dimethanolamine, triethanolamine, p-diethylaminoacetophenone, ethyl p-dimethylamino benzoate, 2-ethylhexyl p-dimethylamino benzoate, N,N-dimethylbenzylamine, and 4,4'-bis(diethylamino) benzophenone. The content thereof is determined depending on the identity (type) of the polymerization initiator and the content thereof.

Examples of the combination of the photopolymerizable compound and the polymerization initiator include a combination of a photoradically polymerizable compound and a photoradical polymerization initiator, as well as a combination of a photocationically polymerizable compound and a photocationic polymerization initiator, and a combination of a photoanionically polymerizable compound and a photoanionic polymerization initiator.

Examples of the photocationic polymerization initiator include, but are not limited to, $B(C_6F_5)_4^-$, $PF_6^-$, $AsF_6^-$, $SbF_6^-$, and $CF_3SO_3^-$ salts of an aromatic onium compound such as diazonium, ammonium, iodonium, sulfonium, and phosphonium, as well as a sulfonated product capable of generating a sulfonic acid, a halide capable of generating a hydrogen halide, and an iron allene complex.

Examples of the photoanionic polymerization initiator include, but are not limited to, an o-nitrobenzyl carbamate derivative, an o-acyloxyl derivative, and an o-carbamoyl oxime amidine derivative.

Furthermore, the curable composition optionally contains a co-sensitizer.

The co-sensitizer further improves the sensitivity of a sensitizing dye to the active energy ray, and reduces the polymerization inhibition of the photopolymerizable compound due to oxygen.

Examples of the co-sensitizer include, but are not limited to, an amine-based compound such as triethanolamine, p-dimethylaminobenzoic acid ethyl ester, p-formyldimethylaniline, and p-methylthiodimethylaniline; a thiol such as 2-mercaptobenzothiazole, 2-mercaptobenzoxazole, 2-mercaptobenzimidazole, 2-mercapto-4(3H)-quinazoline, and β-mercaptonaphthalene; and a sulfide.

Furthermore, the curable composition optionally contains a polymerization inhibitor. Thereby, the storability (storage stability) of the curable composition can be improved. In addition, it is possible to prevent head clogging due to thermal polymerization in the case of discharging the curable composition while heating the composition for decreasing the viscosity.

Examples of the polymerization inhibitor include, but are not particularly limited to, hydroquinone, benzoquinone, p-methoxyphenol, 2,2,6,6-tetramethylpiperidine-1-oxyl (TEMPO), 4-hydroxy-2,2,6,6-tetramethylpiperidine-1-oxyl (TEMPOL), and a cupferron complex of aluminum. A content of the polymerization inhibitor in the curable composition or ink is normally 200 to 20,000 ppm.

The curable composition of the present disclosure is cured by heat or an active energy ray. Hereinafter, the curable composition of the present disclosure may be referred to as "active-energy-ray-curable composition" in some cases, but is not intended to be limited to the active-energy-ray-curable type.

<Organic Solvent>

The active-energy-ray-curable composition of the present disclosure optionally contains an organic solvent although it is preferable to spare the organic solvent. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1 percent by mass.

<Colorant>

The active-energy-ray-curable composition of the present disclosure optionally contains a colorant. As the colorant, various pigments and dyes may be used that impart black, white, magenta, cyan, yellow, green, orange, and gloss colors such as gold and silver, depending on the intended purpose of the composition and requisite properties thereof. A content of the colorant in the composition is not particularly limited, and may be appropriately determined considering, for example, a desired color density and dispersibility of the colorant in the composition. However, it is preferably from 0.1% to 20% by mass relative to the total mass (100% by mass) of the composition. Incidentally, the active-energy-ray-curable composition of the present disclosure does not necessarily contain a colorant but can be clear and colorless. In such a case, for example, such a clear and colorless composition is good for an overcoating layer to protect an image.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments; polycyclic pigments such as phthalocyanine pigments, perylene pigments, perinone pigments, anthraquinone pigments, quinacridone pigments, dioxazine pigments, thioindigo pigments, isoindolinone pigments, and quinophthalone pigments; dye chelates (e.g. basic dye chelates, acid dye chelates, etc.), dye lakes (e.g. basic dye lakes, acid dye lakes), nitro pigments, nitroso pigments, aniline black, and daylight fluorescent pigments.

In addition, a dispersant is optionally added to enhance the dispersibility of pigment. The dispersant has no particular limit and can be, for example, dispersants conventionally used to prepare a pigment dispersion, such as a polymer dispersant.

The dyes include, for example, acidic dyes, direct dyes, reactive dyes, basic dyes, and combinations thereof.

<Other Components>

The active-energy-ray-curable composition of the present disclosure optionally contains other known components. The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, antioxidants, ultraviolet absorbents, chelate agents, pH adjusters, (regulators), and thickeners.

<Preparation of Active-Energy-Ray-Curable Composition>

The active-energy-ray-curable composition of the present disclosure can be prepared by using the components described above. The preparation devices and conditions are not particularly limited. For example, the active-energy-ray-curable composition can be prepared by subjecting a polymerizable monomer, a pigment, a dispersant, etc., to a dispersion treatment using a dispersing machine such as a ball mill, a kitty mill, a disk mill, a pin mill, and a DYNO-MILL to prepare a pigment liquid dispersion, and further mixing the pigment liquid dispersion with a polymerizable monomer, an initiator, a polymerization initiator, a surfactant, and the like.

<Viscosity>

The viscosity of the active-energy-ray-curable composition of the present disclosure has no particular limit because the viscosity can be adjusted depending on the purpose and application devices. For example, if a discharging device configured to discharge the composition from nozzles is employed, the viscosity of the composition is preferably in the range of 3 to 40 mPa·s, more preferably 5 to 15 mPa·s, and particularly preferably 6 to 12 mPa·s in the temperature range of 20 to 65 degrees C., preferably at 25 degrees C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOKI SANGYO CO., LTD.) using a cone rotor (1°34'×R24) at a number of rotation of 50 rpm with an appropriate setting of the temperature of heathermal circulating water in the range of 20 to 65 degrees C. VISCOMATE VM-150III can be used for the temperature adjustment of the circulating water.

<Curing Means>

Preferably, the curable composition is cured by application of heat or irradiation with an active energy ray, and the latter is more preferable.

Active energy rays used for curing an active-energy-ray-curable composition of the present disclosure are not particularly limited, so long as the active energy rays are able to give necessary energy for allowing polymerization reaction of polymerizable components in the composition to proceed. Examples of the active energy rays include electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Application Field>

The application field of the curable composition of the present disclosure is not particularly limited. It can be applied to any field where curable compositions are used. For example, the curable composition is selected to a particular application and used for a resin for processing, a paint, an adhesive, an insulant, a release agent, a coating material, a sealing material, various resists, and various optical materials.

Figure 2:
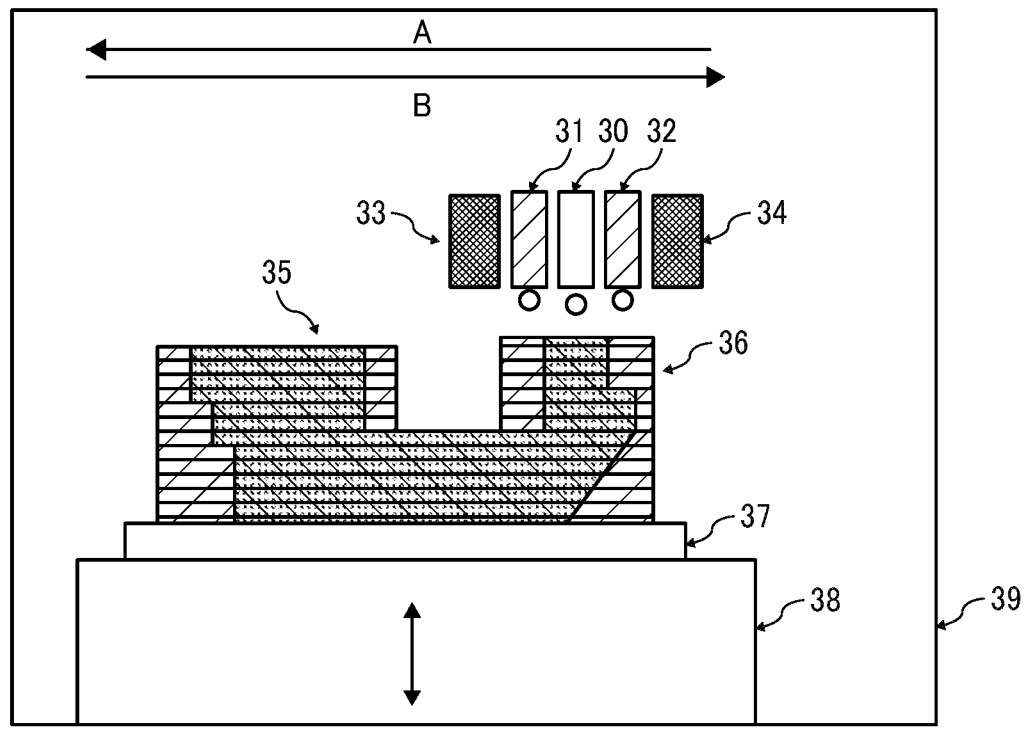
FIG. 2 is a schematic view illustrating another image forming apparatus according to an embodiment of the present invention.
Figure 3A:
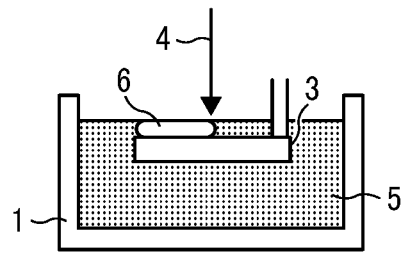
FIGS. 3A to 3D are schematic views illustrating another image forming apparatus according to an embodiment of the present invention.
Figure 3B:
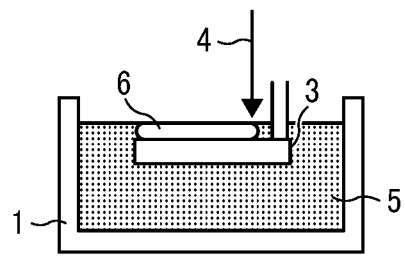
Figure 3C:
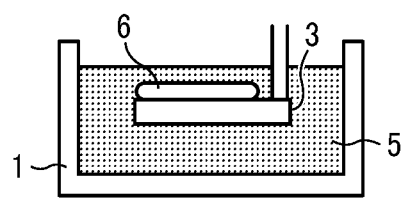
Figure 3D:
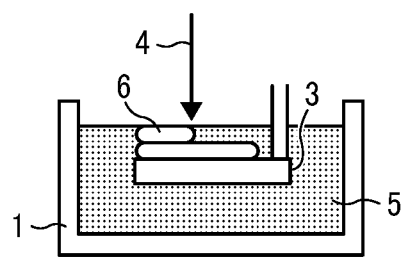

Furthermore, the curable composition of the present disclosure can be used as an ink for forming two-dimensional texts, images, and designed coating film on various substrates and in addition as a three-dimensional object forming material to form a three-dimensional object. This three-dimensional object forming material may also be used as a binder for powder particles used in a powder layer laminating method of forming a three-dimensional object by repeating curing and layer-forming of powder layers, and as a three-dimensional object constituent material (a model material) and a supporting member (a support material) used in an additive manufacturing method (a stereolithography method) as illustrated in FIG. 2 and FIGS. 3A to 3D. FIG. 2 is a diagram illustrating a method of additive manufacturing to sequentially form layers of the active-energy-ray-curable composition of the present disclosure one on top of the other by repeating discharging the active-energy-ray-curable composition to particular areas followed by curing the composition upon irradiation of an active energy ray (details will be described below). FIGS. 3A to 3D is a diagram illustrating a method of additive manufacturing to sequentially form cured layers 6 having respective predetermined forms one on top of the other on a movable stage 3 by irradiating a storing pool (storing part) 1 of the active-energy-ray-curable composition 5 of the present disclosure with the active energy ray 4.

An apparatus for fabricating a three-dimensional object by using the active-energy-ray-curable composition of the present disclosure is not particularly limited and can be a known apparatus. For example, the apparatus includes a containing device, a supplying device, and a discharging device of the curable composition, and an active energy ray irradiator.

In addition, embodiments of the present disclosure include cured products obtained by curing the curable composition and processed products obtained by processing structures having the cured products on a substrate. The processed product is fabricated by, for example, heat-drawing or punching the cured product or structure having a sheet-like form or film-like form, and suitably used for applications requiring molding of the surface after decoration, such as gauges or operation panels of vehicles, office machines, electric and electronic machines, and cameras.

The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

<Composition Stored Container>

The composition stored container of the present disclosure refers to a container containing the active-energy-ray-curable composition and is suitable for the applications as described above. For example, when the active-energy-ray-curable composition of the present disclosure is used for ink, a container storing the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable that the container is made of a light blocking material that blocks light or the container is covered with a light blocking sheet or the like.

<Image Forming Method and Image Forming Apparatus>

An image forming method of the present disclosure may be performed using an active energy ray and/or while applying heat.

The image forming method in accordance with some embodiments of the present invention includes at least an irradiating step of irradiating the curable composition of the present disclosure with an active energy ray to cure the curable composition. The image forming apparatus of the present disclosure includes at least an irradiator to irradiate the curable composition of the present disclosure with an active energy ray and a storing part containing the curable composition of the present disclosure. The storing part may include the container mentioned above. Furthermore, the method and the apparatus may respectively include a discharging step and a discharging device to discharge the active-energy-ray-curable composition. The method of discharging the active-energy-ray-curable composition is not particularly limited, and examples of the method include a continuous jetting method and an on-demand method. The on-demand method includes a piezo method, a thermal method, an electrostatic method, etc.

FIG. 1 is a diagram illustrating a two-dimensional image forming apparatus equipped with an inkjet discharging device. Printing units 23a, 23b, 23c, and 23d respectively having ink cartridges and discharging heads for yellow, magenta, cyan, and black curable inks discharge the inks onto a recording medium 22 fed from a supplying roller 21. Thereafter, light sources 24a, 24b, 24c, and 24d emit active energy rays to the inks, thereby curing the inks to form a color image. Thereafter, the recording medium 22 is conveyed to a processing unit 25 and a printed matter reeling roll 26. Each of the printing unit 23a, 23b, 23c and 23d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 22 is not particularly limited. Specific examples of the recording medium include, but are not limited to, paper, film, ceramics, glass, metal, and composite materials of any of paper, film, ceramics, glass, and metal, each of which may be in the form of a sheet. The image forming apparatus may have either a one-side printing configuration or a two-side printing configuration. The recording medium is not limited to articles used as typical recording media. Examples of articles usable as the recording medium include cardboard, building materials (such as wall paper and floor material), concrete, cloth for apparel (such as T-shirts), textile, and leather.

Optionally, multiple colors can be printed with no or weak active energy ray from the light sources 24a, 24b, and 24c, followed by irradiation of the active energy ray from the light source 24d. As a result, energy and cost can be saved.

Examples of the recorded matter having images printed with the ink of the present disclosure include not only those having printed images or texts on a plain surface of conventional paper or resin film, but also those having printed images or texts on a rough surface or a surface made of various materials such as metal or ceramic. In addition, by laminating layers of two-dimensional images, a partially stereoscopic image (formed of two-dimensional parts and three-dimensional parts) or a three-dimensional objects can be fabricated.

FIG. 2 is a schematic diagram illustrating another example of the image forming apparatus (three-dimensional (3D) image forming apparatus) of the present disclosure. An image forming apparatus 39 illustrated in FIG. 2 sequentially forms thin layers one on top of the other using a head unit in which inkjet heads are arranged, movable in the directions indicated by the arrows A and B. In the image forming apparatus 39, a discharging head unit 30 for forming additive manufacturing layers discharges a first curable composition, and discharging head units 31 and 32 for forming support layers discharges a second curable composition having a different composition from the first curable composition, while ultraviolet irradiators 33 and 34 adjacent to the discharging head units 31 and 32 cure the compositions. To be more specific, for example, after the discharging head units 31 and 32 discharge the second curable composition onto a substrate 37 and the second active-energy-ray-curable composition is solidified by irradiation with an active energy ray to form a first support layer having a pool for composition, the discharging head unit 30 discharges the first curable composition onto the pool and the first curable composition is solidified by irradiation with an active energy ray, thereby forming a first additive manufacturing layer. This step is repeated multiple times while lowering a stage 38 movable in the vertical direction to laminate the support layers and the additive manufacturing layers to fabricate a solid object 35. Thereafter, a support 36 is removed, if desired. Although only a single discharging head unit 30 for forming additive manufacturing layer is provided to the image forming apparatus 39 illustrated in FIG. 2, it is also possible to provide two or more discharging head units 30.

EXAMPLES

Hereinafter, the present invention will be more specifically explained with reference to Examples and Comparative Examples. However, the present invention should not be construed to be limited to Examples and Comparative Examples. Incidentally, the units "parts" and "%" in Examples and Comparative Examples refer to "parts by mass" and "% by mass", respectively. The $^1$H-NMR spectrum was measured using $^1$H-NMR (500 MHz) (manufactured by JEOL Ltd.).

Production Example 1

First, 5.00 g of tert-butyl L-alaninate hydrochloride manufactured by Tokyo Chemical industry Co., Ltd. was dissolved in 40 mL of water, to which 40 mL of ethyl acetate and 39.51 g (286 mmol) of potassium carbonate were added. The mixture was cooled in ice bath, to which subsequently 18.1 g (200 mmol) of acrylic acid chloride was dripped, and the mixture was stirred at room temperature overnight. From the reaction solution, an ethyl acetate layer was extracted and fractionated. The resulting ethyl acetate layer was concentrated to obtain 34.16 g (yield: about 97%) of a colorless oily compound a-4.

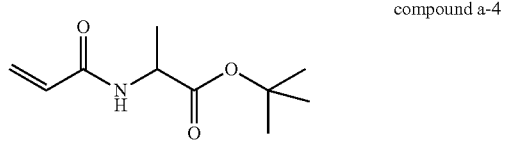

compound a-4

Identified data is as follows.

$^1$H-NMR (CDCl$_4$): δ 1.40-1.45 (m, 12H), 4.72-4.78 (m, 1H), 5.68-5.70 (m, 1H), 6.23-6.27 (m, 2H), 6.31-6.34 (m, 1H)

Production Example 2

A slurry obtained by mixing 22.33 g (191 mmol) of DL-valine manufactured by Tokyo Chemical Industry Co., Ltd. with 125 mL of methanol was cooled in ice bath, and then reacted by dripping 45.35 g (381 mmol) of thionyl chloride to the slurry, to obtain a reaction solution. The reaction solution was stirred at room temperature overnight, then the resulting reaction solution was concentrated to obtain 32.35 g of DL-valine methyl ester hydrochloride, which was a white solid. The resulting DL-valine methyl ester hydrochloride was directly used for the subsequent reaction.

32.35 g of the DL-valine methyl ester hydrochloride was dissolved in 250 mL of water, to which 39.51 g (286 mmol) of potassium carbonate was added. The mixture was cooled in ice bath, to which subsequently 18.1 g (200 mmol) of acrylic acid chloride was dripped, and the mixture was stirred at room temperature overnight. From the reaction solution, an ethyl acetate layer was extracted and fractionated with ethyl acetate. The resulting ethyl acetate layer was concentrated to obtain 34.16 g (yield: about 97%) of a colorless oily compound c-1.

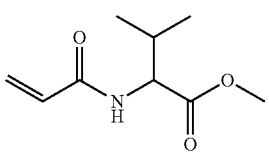

compound c-1

Identified data is as follows,
$^1$H-NMR (CDCl$_3$): δ 0.92-0.97 (m, 6H), 2.16-2.25 (m, 1H), 3.76 (s, 3H), 4.66-4.69 (m, 1H), 5.68-5.71 (m, 1H), 6.11 (s1, 1H), 6.14-6.20 (q, 1H), 6.31-6.34 (m, 1H)

Production Example 3

A slurry obtained by mixing 25.00 g (191 mmol) of DL-isoleucine manufactured by Tokyo Chemical industry Co., Ltd. with 125 mL of methanol was cooled in ice bath, and then reacted by dripping 45.35 g (381 mmol) of thionyl chloride to the slurry, to obtain a reaction solution. The reaction solution was stirred at room temperature overnight, then the resulting reaction solution was concentrated to obtain 34.79 g of DL-isoleucine methyl ester hydrochloride, which was a white solid. The resulting DL-isoleucine methyl ester hydrochloride was directly used for the subsequent reaction.

Next, 34.79 g of DL-isoleucine methyl ester hydrochloride was dissolved in 250 mL of water, to which 39.51 g (286 mmol) of potassium carbonate was added. The mixture was cooled in ice bath, to which subsequently 18.1 g (200 mmol) of acrylic acid chloride was dripped, and the mixture was stirred at room temperature overnight. From the reaction solution, an ethyl acetate layer was extracted and fractionated with ethyl acetate. The resulting ethyl acetate layer was concentrated to obtain 34.16 g (yield: about 97%) of a colorless oily compound.

Furthermore, 300 g of Silica Gel C-300 manufactured by Wako Pure Chemical Industries, Ltd. was put into the compound, which was purified by column chromatography using hexane and ethyl acetate as eluents to obtain 32.7 g (yield: about 86%) of colorless liquid compound d-1.

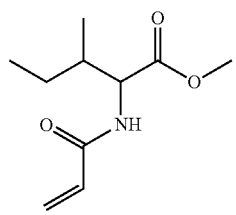

compound d-1

Identified data is as follows.
$^1$H-NMR (CDCl$_3$): δ 0.92-0.95 (m, 6H), 1.16-1.28 (m, 1H) 1.43-1.51 (m, 1H), 1.59-1.97 (m, 1H), 3.76 (s, 3H), 4.69-4.72 (m, 1H), 5.68-5.70 (m, 1H), 6.13-6.19 (m, 2H), 6.30-6.34 (m, 1H)

Production Example 4

A slurry obtained by mixing 10.00 g (76 mmol) of DL-leucine manufactured by Tokyo Chemical Industry Co., Ltd. with 50 of methanol was cooled in an ice bath, and then reacted by dripping 18.14 g (153 mmol) of thionyl chloride to the slurry, to obtain a reaction solution. The reaction solution was stirred at room temperature overnight, and then the resulting reaction solution was concentrated to obtain 13.50 g of DL-leucine methyl ester hydrochloride, which was a white solid. The resulting DL-leucine methyl ester hydrochloride was directly used for the subsequent reaction.

Next, 13.50 g of the DL-leucine methyl ester hydrochloride was dissolved in 108 mL of water, to which 15.80 g (114 mmol) of potassium carbonate was added. The mixture was cooled in ice bath, to which subsequently 15.8 g (80 mmol) of acrylic acid chloride was dripped, and the mixture was stirred at room temperature overnight. From the reaction solution, an ethyl acetate layer was extracted and fractionated with ethyl acetate. The resulting ethyl acetate layer was concentrated to obtain 13.40 g yield: about 88%) of a colorless oily compound e-1.

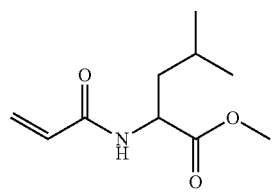

compound e-1

Identified data is as follows.
$^1$H-NMR (CDCl$_3$): δ 0.94-0.97 (m, 6H), 1.54-1.61 (m, 1H), 1.64-1.68 (m, 2H), 3.75 (s, 3H), 4.72-4.77 (m, 1H), 5.66-5.69 (m, 1H), 6.12-6.18 (q, 1H), 6.22 (s1, 1H), 6.30-6.33 (m, 1H)

Production Example 5

A slurry obtained by mixing 5.00 g (49 mmol) of DL-3-aminobutyric acid manufactured by Tokyo Chemical Industry Co., Ltd. with 25 mL of methanol was cooled in ice bath, and then reacted by dripping 11.54 g (97 mmol) of thionyl chloride to the slurry, to obtain a reaction solution. The reaction solution was stirred at room temperature overnight, and then the resulting reaction solution was concentrated to obtain 7.40 g of DL-3-aminobutyric acid methyl ester hydrochloride, which was a pale yellow oil. The resulting DL-3-aminobutyric acid methyl ester hydrochloride was directly used for the subsequent reaction.

Next, 7.40 g of the DL-3-aminobutyric acid methyl ester hydrochloride was dissolved in 60 mL of water, to which 60 ml of ethyl acetate and 10.06 g (73 mmol) of potassium carbonate were added. The mixture was cooled in ice bath, to which subsequently 4.6 g (80 mmol) of acrylic, acid chloride was dripped, and the mixture was stirred at room temperature overnight. From the reaction solution, an ethyl acetate layer was extracted and fractionated. The resulting ethyl acetate layer was concentrated to obtain 6.97 g (yield: about 84%) of a colorless oily compound f-1.

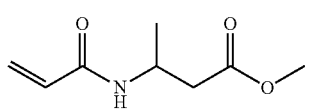

compound f-1

Identified data is as follows.
$^1$H-NMR (CDCl$_3$): δ 1.26-1.27 (d, 3H), 2.57-2.58 (d, 2H), 3.70 (s, 3H), 4.40-4.48 (m, 1H), 5.63-5.65 (m, 1H), 6.06-6.11 (m, 1H), 6.25-6.29 (m, 1H), 6.36 (s1, 1H)

Comparative Production Example 1

A slurry obtained by mixing 25.0 g (191 mmol) of 6-aminohexanoic acid manufactured by Tokyo Chemical Industry Cho., Ltd. with 125 mL of methanol was cooled in ice bath, and then reacted by dripping 45.35 g (381 mmol) of thionyl chloride to the slurry, to obtain a reaction solution. The reaction solution was stirred at room temperature overnight, and then the resulting reaction solution was concentrated to obtain 36.52 g of 6-aminohexanoic acid methyl ester hydrochloride, which was a white solid. The resulting 6-aminohexanoic acid methyl ester hydrochloride was directly used for the subsequent reaction.

Next, 36.52 g of 6-aminohexanoic acid methyl ester hydrochloride was dissolved in 250 mL of water, to which 39.51 g (286 mmol) of potassium carbonate was added. The mixture was cooled in ice bath, to which subsequently 18.1 g (200 mmol) of acrylic acid chloride was dripped, and the mixture was stirred at room temperature overnight. From the reaction solution, an ethyl acetate layer was extracted and fractionated with ethyl acetate. The resulting ethyl acetate layer was concentrated to obtain 29.0 g (yield: about 76%) of pale brown solid having the following structural formula (1), which was specified as a compound of Comparative Production Example 1.

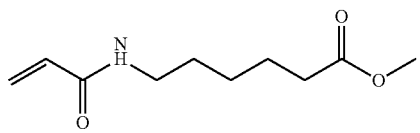

structural formula (1)

Identified data is as follows.
$^1$H-NMR (CDCl$_3$): δ 1.34-1.41 (m, 2H), 1.54-1.61 (quin, 2H), 1.63-1.69 (quin, 2H), 2.31-2.34 (t, 2H), 3.33-3.37 (q, 2H), 3.67 (s, 3H), 5.62-5.65 (m, 2H), 6.06-6.11 (q, 1H), 6.26-6.30 (m, 1H)

Comparative Production Example 2

A slurry obtained by mixing 6.19 g (60 mmol) of N-methyl-DL-alanine manufactured by Combi-Blocks Inc, with 40 mL of methanol was cooled in ice bath, and then reacted by dripping 14.28 g (120 mmol) of thionyl chloride to the slurry, to obtain a reaction solution. The reaction solution was stirred at room temperature overnight, and then the resulting reaction solution was concentrated to obtain 8.4 g of N-methyl-DL-alanine methyl ester, which was a colorless liquid. The resulting N-methyl-DL-alanine methyl ester was directly used for the subsequent reaction.

Next, 8.4 g of N-methyl-DL-alanine methyl ester was dissolved in 40 mL of water, to which 11.94 g (87 mmol) of potassium carbonate was added. The mixture was cooled in ice bath, to which subsequently 5.38 g (59 mmol) of acrylic acid chloride was dripped, and the mixture was stirred at room temperature overnight. From the reaction solution, an ethyl acetate layer was extracted and fractionated with ethyl acetate. The resulting ethyl acetate layer was concentrated to a yellow oily compound.

Furthermore, 300 g of Silica Gel C-300 manufactured by Wako Pure Chemical Industries, Ltd. was put into the compound, which was purified by column chromatography using hexane and ethyl acetate as eluents to obtain 4.1 g (yield: about 44%) of colorless liquid having the following structural formula (2), which was specified as a compound of Comparative Production Example 2.

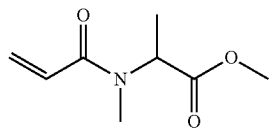

structural formula (2)

Identified data is as follows.
$^1$H-NMR, (CDCl$_3$): δ 1.43-1.44 (d, 3H), 3.03 (s, 3H), 3.72 (s, 3H), 5.27-5.31 (m, 1H), 5.68-5.76 (m, 1H), 6.35-6.39 (m, 1H), 6.58-6.63 (m, 1H)

[Active-Energy-Ray-Curable Comparison Compound 3]

A commercially available hydroxyethyl acrylamide (manufactured by KJ Chemicals Corporation) represented by the following structural formula (3) was specified as an active-energy-ray-curable comparison compound 3.

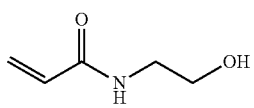

structural formula (3)

Examples 1a to 8a, and Comparative Examples 1a to 3a

[Preparation of Photocurable Composition]

Each of Compounds of Production Examples 1 to 5 and Comparative Production Examples 1 to 2, and Comparison Compound 3 was mixed with a photopolymerization initiator IRGACURE 907 [2-methyl-1-[4-(methylthio)phenyl]-2-morpholinopropane-1-one] (manufactured by BASF Japan) using a magnetic stirrer to prepare each of photocurable compositions of Examples 1a to 8a and Comparative Examples 1a to 3a.

The photopolymerization reactivity and the pencil hardness of the photocurable compositions of Examples 1a to 8a and Comparative Examples 1a to 3a were evaluated as below. The results are presented in Table 1.

<Photopolymerizability>

The photopolymerization reactivity of each photocurable composition was evaluated using a measuring apparatus including DSC-7020 (manufactured by SII NanoTechnology Inc.) in combination with a spot light source LA-410UV (manufactured by HAYASHI WATCH-WORKS CO., LTD.).

Specifically, a calorific value (mJ/mg) per unit weight was measured when irradiating the composition with ultraviolet ray at 365 nm with an intensity of 100 mW/cm$^2$ in the atmosphere for 0.02 minutes. The resulting calorific value per unit weight was multiplied by the molecular weight to calculate a calorific value per 1 mole, which was taken as an indicator for comparing the reactivities of the photopolymerization reactions.

<Pencil Hardness>

The photocurable composition prepared in the above method was applied on a PET film so as to have a thickness of 10 μm. The composition was cured by 17 irradiations with an integrated irradiation energy of 10,600 mJ/cm$^2$, under a condition that an irradiation energy per 1 pass of a metal halide lamp was 600 mJ/cm$^2$, in the atmosphere. After allowing the sample to stand overnight, a pencil hardness test was carried out according to JIS K 5600-5-4 standard. Herein, a pencil scratch hardness tester (Model: KT-VF 2391, manufactured by Kotec Ltd., load: 750 g) and a pencil for pencil hardness test (manufactured by Mitsubishi Pencil Co., Ltd.) were used.

TABLE 1

| | Active-energy-ray-curable compound | State of compound (normal temperature, and normal pressure) | Concentration of initiator | Evaluation results | |
|---|---|---|---|---|---|
| | | | | Photopolymerization reactivity kJ/mol | Pencil hardness Rank |
| Example 1a | Compound a-4 | Liquid | 10% | 24 | B |
| Example 2a | Compound c-1 | Liquid | 2% | 44 | HB |
| Example 3a | Compound c-1 | Liquid | 5% | 48 | HB |
| Example 4a | Compound c-1 | Liquid | 10% | 47 | HB |
| Example 5a | Compound c-1 | Liquid | 15% | 48 | HB |
| Example 6a | Compound d-1 | Liquid | 10% | 52 | HB |
| Example 7a | Compound e-1 | Liquid | 10% | 41 | B |
| Example 8a | Compound f-1 | Liquid | 10% | 20 | F |
| Comparative Example 1a | Structural Formula (1) | Solid | 10% | — | — |
| Comparative Example 2a | Structural Formula (2) | Liquid | 10% | 15 | 2B |
| Comparative Example 3a | Structural Formula (3) | Liquid | 10% | 6 | H |

Table 1 indicates that the photocurable compositions of Examples 1a to 8a including the photopolymerizable compounds of Production Examples 1 to 5 are excellent in photopolymerization reactivity and hardness (pencil hardness) of the cured film. This indicates that the compounds have an appropriate polarity attributed to the secondary acrylamide and the ester and an appropriate degree of the steric hindrance attributed to the alkylene group containing the tertiary carbon, and thus the liquid state can be achieved, and furthermore both the photopolymerizability and the hardness of the cured film can be achieved at high levels by the intermolecular interaction. It can be considered that the compounds are suitable for the active-energy-ray-curable composition and ink, especially the ink jet ink.

Examples 1b to 8b

[Preparation of Ink]
100 parts of each photopolymerizable compound of Production Examples 1 to 5, 10 parts of a photopolymerization initiator IRGACURE 907 (manufactured by BASF Japan), and 3 parts of a carbon black MICROLITH Black C-K (manufactured by BASF Japan) were mixed to obtain each ink of Examples 1b to 8b.

Examples 1c to 8c 100 parts of each photopolymerizable compound of Production Examples 1 to 5, 10 parts of a photopolymerization initiator IRGACURE 907 (manufactured by BASF Japan), and 3 parts of a blue pigment MICROLITH Blue 4G-K (manufactured by BASF Japan) were mixed to obtain each ink of Examples 1c to 8c.

[Ink Evaluation 1]
Each ink of Examples 1b to 8b and Examples 1c to 8c was inkjet-discharged onto a slide glass, and then cured by irradiating the slide glass with ultraviolet ray at 365 nm with an intensity of 200 mW/cm² using a UV irradiator LH6 (manufactured by Fusion Systems Japan Co., Ltd.). As a result, each ink can be inkjet-discharged without any problem, and each ink image was sufficiently cured.

[Ink Evaluation 2]
A pen nib of a dip pen is dipped in each ink of Examples 1b to 8b and Examples 1c to 8c, and letters were written on a PET film and plain paper. Subsequently, the ink was cured by irradiating the film and paper with ultraviolet ray at 365 nm with an intensity of 200 mW/cm² using the UV irradiator LH6 (manufactured by Fusion Systems Japan Co., Ltd.). As a result, each ink image was sufficiently cured.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A curable composition comprising an acrylamide compound represented by the following general formula (1):

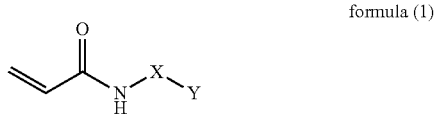

formula (1)

wherein, X represents a branched alkylene group having 2 to 5 carbon atoms, and Y represents the following general formula (2):

formula (2)

wherein, R represents an alkyl group having 1 to 4 carbon atoms, and * represents a binding site with X.

2. The curable composition according to claim 1, wherein X in the general formula (1) is a branched alkylene group having 4 to 5 carbon atoms.

3. The curable composition according to claim 1, wherein the acrylamide compound represented by the general formula (1) is an acrylamide compound represented by the following general formula (3):

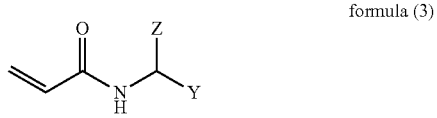

formula (3)

wherein, Z represents an alkyl group having 1 to 4 carbon atoms, and represents the following general formula (2):

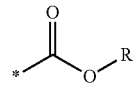

formula (2)

wherein, R represents an alkyl group having 1 to 4 carbon atoms, and * represents a binding site with a tertiary carbon atom in the general formula (3).

4. A curable ink comprising the curable composition according to claim 1.

5. The curable ink according to claim 4, wherein the curable ink is an inkjet ink.

6. A composition stored container comprising:
a container; and
the curable composition according to claim 1.

7. A two-dimensional or three-dimensional image forming apparatus comprising:
the composition stored container according to claim 6; and
an irradiator to emit an active energy ray.

8. A two-dimensional or three-dimensional image forming method, comprising:
irradiating the curable composition according to claim 1 with an active energy ray.

9. A cured product obtained by irradiating the curable composition according to claim 1 with an active energy ray.

10. A decorated body comprising:
a substrate; and
a surface decoration on the substrate, the surface decoration comprising the cured product according to claim 9.

* * * * *